US010515376B2

(12) United States Patent
Du (10) Patent No.: US 10,515,376 B2
(45) Date of Patent: Dec. 24, 2019

(54) SYSTEMS AND METHODS OF TRACKING THE DELIVERY AND POST-DELIVERY STATUS FOR ELECTROMAGNETICALLY TRANSMISSIBLE CONTENTS DELIVERED VIA USER INITIATED AND CONTROLLED HYBRID DELIVERY MODES WITH THE INTERPLAY OF A MACHINE-READABLE CODE SYSTEM (71) Applicant: Lee Du, Palo Alto, CA (US)

(72) Inventor: Lee Du, Palo Alto, CA (US)

(73) Assignee: Lee Du, Palo Alto, CA (US)

( * ) Notice: Subject to any disclaimer, the term of this patent is extended or adjusted under 35 U.S.C. 154(b) by 213 days.

(21) Appl. No.: 15/076,282

(22) Filed: Mar. 21, 2016

(65) Prior Publication Data

US 2017/0272501 A1    Sep. 21, 2017

Related U.S. Application Data (63) Continuation-in-part of application No. 13/366,349, filed on Feb. 5, 2012, now Pat. No. 9,425,991, and a continuation-in-part of application No. 12/077,105, filed on Mar. 17, 2008, now abandoned, said application No. 13/366,349 is a continuation-in-part of application No. 12/928,984, filed on Dec. 24, 2010, now Pat. No. 9,237,036.

(60) Provisional application No. 62/136,266, filed on Mar. 20, 2015, provisional application No. 61/462,910, filed on Feb. 8, 2011, provisional application No. 60/997,252, filed on Oct. 1, 2007, provisional application No. 61/284,897, filed on Dec. 28, 2009.

(51) Int. Cl.
*H04L 29/08* (2006.01)
*G06Q 30/02* (2012.01)
*H04W 4/12* (2009.01)

(52) U.S. Cl.
CPC ........... *G06Q 30/02* (2013.01); *H04L 67/02* (2013.01); *H04L 67/18* (2013.01); *H04W 4/12* (2013.01)

(58) Field of Classification Search
CPC ... H04L 41/509; H04L 67/2842; H04L 41/50; H04L 67/02; H04L 67/18; H04W 4/029; H04W 4/021; H04W 4/12
See application file for complete search history.

(56) References Cited

U.S. PATENT DOCUMENTS

7,058,610 B1 * 6/2006 Pintsov ............... G07B 17/0008
209/900
9,105,016 B2 * 8/2015 Briggman ............... H04L 51/34
(Continued)

*Primary Examiner* — Chirag R Patel
(74) *Attorney, Agent, or Firm* — Bo-In Lin (57) ABSTRACT The present invention discloses a network communication system that includes a network processing center for receiving and converting an electronic or electro-magnetically transmissible data/content into a physically deliverable object and/or network transmissible content data files for carrying out a hybrid delivery of the data/content by a physical delivery process and/or a network electro-magnetic delivery process to a recipient or an ECRMA. A machine-readable code such as QR code is used in the continuous information flow among the various components of this system. The delivery status of the electronic contents and the post-delivery activities are tracked by a variety of mechanisms and the information obtained from the tracking is send back to the content-senders.

11 Claims, 7 Drawing Sheets (56) References Cited

U.S. PATENT DOCUMENTS

| | | | | |
|---|---|---|---|---|
| 9,451,045 | B2* | 9/2016 | Newton | H04L 67/2852 |
| 2001/0051988 | A1* | 12/2001 | Kim | G06Q 10/107 |
| | | | | 709/206 |
| 2007/0138347 | A1* | 6/2007 | Ehlers | G01C 21/3461 |
| | | | | 246/1 R |
| 2007/0146777 | A1* | 6/2007 | Cranitch | H04L 51/066 |
| | | | | 358/1.15 |
| 2008/0195456 | A1* | 8/2008 | Fitzpatrick | G06F 17/30867 |
| | | | | 705/7.15 |
| 2010/0325666 | A1* | 12/2010 | Wiser | H04N 7/17336 |
| | | | | 725/44 |
| 2016/0227360 | A1* | 8/2016 | Huang | H04W 4/02 |

\* cited by examiner

SYSTEMS AND METHODS OF TRACKING THE DELIVERY AND POST-DELIVERY STATUS FOR ELECTROMAGNETICALLY TRANSMISSIBLE CONTENTS DELIVERED VIA USER INITIATED AND CONTROLLED HYBRID DELIVERY MODES WITH THE INTERPLAY OF A MACHINE-READABLE CODE SYSTEM

This application is a Non-Provisional Application of a Provisional Application 62/136,266 filed on Mar. 20, 2015. Application 62/136,266 is a Continuation-in-Part Application (CIP) of a co-pending Non-Provisional application Ser. No. 13/366,349 filed on Feb. 5, 2013 and application Ser. No. 13/366,349 is a Continuation-in-Part Application of another application Ser. No. 12/077,105 that was filed on Mar. 17, 2008 and also a Continuation in Part Application of application Ser. No. 12/928,984 filed on Dec. 24, 2010 issued as U.S. Pat. No. 9,237,036 on Jan. 12, 2016. The disclosures made in Application 62/136,266, Ser. Nos. 13/366,349, 12/928,984 and 12/077,105 are hereby incorporated by reference in this Patent Application.

BACKGROUND OF THE INVENTION

1. Field of the Invention

This invention relates generally to the systems and methods for tracking and obtaining feedbacks for electrci-magnetically transmissible contents (e-TC) delivered in an array of hybrid modes of content deliveries from a sender to the designated recipient. More particularly, this invention is related to methods and network systems implemented with a machine readable code to allow a sender to control, monitor and track the delivery of either an article that embodies the Internet-transmissible contents or the delivery to different functional apparatus that embodies the contents to designated recipients while providing feedback information to the sender.

2. Description of the Related Art

Electronically transmissible contents (E-TC) such as e-ads transmitted through the Internet are efficient and convenient to be spread and are used more often. However, the delivery format of e-TC through Internet has the limitation of its capability to reach the group of people who have no or limited Internet access. A further limitation of delivering e-TC over the Internet is the lack of information over the recipient's geographic and other status.

In the field of advertising, both printed ads and e-ads have the limitation in that there are no processes for monitoring the customer's buying decision, i.e., the conversion rate. Once the printed ads and/or the e-ads are sent, the advertiser has very little information with which to assess the effectiveness of the advertisements due to the limited amount of information the advertiser can collect about the customer's response to the advertisements delivered either by mail or by Internet.

In a broader sense, when e-TC is received through either the Internet or non-Internet routes, and then accessed in the off-line environment, i.e., not directly connected with the Internet, it remains unknown to the advertiser as the e-TC sender how the e-TC is accessed or manipulated in various ways. Therefore, it is difficult to assess how much effort and financial resources are either effective or wasted by sending out e-TC as advertisements to large numbers of recipients (receivers) while receiving in return a very limited amount of information about recipient's response to these advertisements.

Additionally, the large amount e-TC in the Internet age as well as tangibles such as printed information can flood a recipient. This Application therefore discloses a single machine-readable code (MRC) as the gateway to all the information addressed to a recipient.

Once the recipient receives this specific code, it can be processed in a variety of ways.

(1) Access of this MRC can lead to a website where all the information addressed to that recipient is stored and can be accessed in different manners, or (2) This MRC can be accessed by an ECRMA.

This MRC is address-specific in that it can be accessed only by the recipient who has proven representation of a given physical address, or an address linked in a variety of ways to that physical address such as a virtual postal address, etc. An address-linked mechanism (ALM) is one of the features of this MRC, e.g., when the recipient scans or accesses the MRC, the MRC respond by asking for some information which are linked to the updated address/location of the recipient, such as the cellphone number that is linked to this address, the current location as the scanning occurs, etc.

When the user sends out the request which may involve the MRC to be generated, the ALM is part of the process.

The information of previous, current and subsequent locations can be obtained through a variety of ways, for example, by the location tracking mechanism in the smart phone or in the ECRMA, by the recipient-initiated update process, etc.

Either the sender or the recipient can define where the access of the MRC can be allowed. For example, it can be defined that the access can be allowed only at one or more given physical address(es), as would be verified by the ECRMA used to access the MRC.

This MRC can be continuously updated or modified after the sender has initiated this process.

In addition to the ALM to control the access of the MRC, other ways can be used by the sender or recipient. For example, a voice-recognition feature can be required to access the MRC.

The tangible deliverable will have a chip, we call it an Internet of Things device (ITD), attached to it. With the ITD, the tracking of the delivery and post-delivery activities can be continuous. Further, the communication between the ITD and the processing unit/center is an ongoing process, ensuring continual modification of the tracking parameters, etc.

Thus, the communication among the three delivery routes, the tangible with the ITD, the ECRMA and the MRC, are made available and continuous, with the integration of ALM among them.

Therefore, a need exists in the art of obtaining feedback for e-TC via hybrid delivery modes to provide improved system configuration to dynamically track the post-delivery status of e-TC and to represent all the e-TC to a given recipient in a more controllable way by a machine-readable code such as QR code.

SUMMARY OF THE PRESENT INVENTION

It is an aspect of this invention to provide a system and a method by implementing a machine readable code (MRC) to address the problems that large amount e-TC and tangible deliverable objects such as printed advertisements are received on a daily basis. Most of the households are flooded and overwhelmed by large amounts of garbage mails in addition to the large amount of e-TC transmitted over the networks. The machine-readable code (MRC) is implemented as the gateway to all the information addressed to a recipient such that the above mentioned problems can be resolved.

Specifically, it is an aspect of this invention that when the recipient receives this specific code, the recipient can process the information in a variety of ways. Access of this MRC can lead to a website where all the information addressed to that recipient is stored and can be accessed in many ways. Alternately, the MRC can be applied to access an ECRMA that provide wide varieties of process options.

Another aspect of this invention is to implement the MRC as an address-specific code. This address-specific code can be used only by the recipient who has proven representation of a given physical address, or an address linked in a variety of ways to that physical address such as a virtual postal address, etc. An address-linked mechanism (ALM) is one of the features of this MRC, e.g, when the recipient scans or access the MRC, the MRC responds by asking for some information that is linked to the updated address/location of the recipient, such as the cellphone number that is linked to this address, the current location as the scanning occurs, etc.

Another aspect of this invention is that the user sends out the request that may involve the desire for the MRC to be generated; the ALM is part of the process. The information of previous, current and subsequent locations can be obtained through a variety of ways, for example, by the location tracking mechanism in the smart phone or in the ECRMA, by the recipient-initiated update process, etc.

Another aspect of this invention is to provide the flexibilities of defining the MRC code by either the sender or the recipient to allow different options of information access. Specific examples may include the use of the MRC code to allow access to one or more given physical addresses, as verified by the ECRMA used to access the MRC.

Another aspect of this invention is to provide a system and method to continuously update and modify the MRC after the sender has initiated this process.

In addition to the ALM to control the access of the MRC, other ways can be used by the sender or recipient. For example, a voice-recognition feature can be required to access the MRC.

The tangible deliverable will have a chip, we call it an Internet of Things device (ITD), attached to it. With the ITD, the tracking of the delivery and post-delivery activities can be continuous. Moreover, the communication between the ITD and the processing unit/center is an ongoing process, ensuring continual modification of the tracking parameters, etc.

Thus, the communication among the three delivery routes, the tangible with the ITD, the ECRMA and the MRC, are made available and continuous, with the integration of ALM among them.

DESCRIPTIONS OF PREFERRED EMBODIMENT

Figure 1:
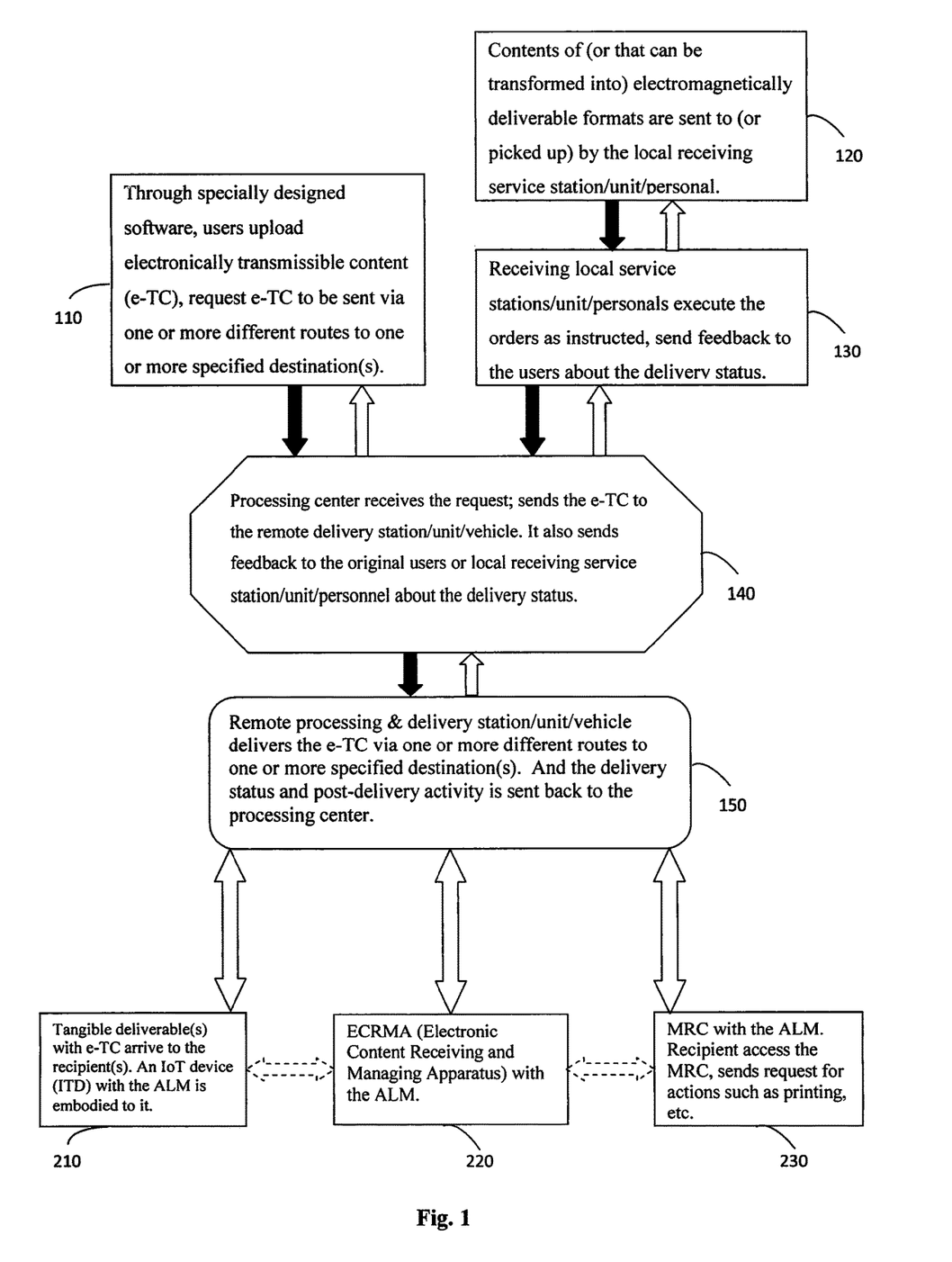
FIG. 1 is a system diagram for showing the steps performed by the hybrid method of delivering, through the telecommunication network (TN), a physically deliverable object that embodies e-TC and/or e-TC to an electronic content receiving/managing apparatus (ECRMA). An Internet of the things (IoT) device (ITD) with the address-linked mechanism (ALM) is attached to the physically deliverable object.

FIG. 1 is a system diagram for illustrating the processes according to an exemplary method of this invention. An electronic content sender for sending the electronic content through the hybrid content delivery system of this invention starts the process by uploading (Step 110) electronically transmissible content (e-TC) through a telecommunication network to a processing center (Step 140). Alternately, a user/sender may physically deliver a medium that embodies the said contents such as a letter or pictures, or other contents that are ready for or can-be-converted to network or electro-magnetically transmissible content outbound to a local service station (Step 120), or may drop the contents in pick-up locations/boxes arranged by the service station. Alternatively, the local receiving station/unit in Step 120 and Step 130 can be an automated setup with which the conversion of non-digital format to digital format (e-TC format) can be accomplished, with the digital format be sent along to the recipient for its designated purpose. The local service station then executes the orders received from the user and sends a status report to the user to update the user about the content's delivery status. The electro-magnetic transmissible content either uploaded or physically received by the processing center is sent to a remote delivery station through Internet or other methods of the telecommunication network (Step 140). In this step, the processing center further sends a status report to the user/sender about the reception and processing and delivery status of the content received.

Then the remote delivery station or a processing and delivery vehicle has different options to process the electronic content received from the telecommunication network, depending upon different delivery routes and different final destinations of the electronic contents. The processing and delivery station or vehicle first determines a delivery route and destination and sends a status report back to the electronic content sender about the status of the process and delivery (Step 150). The delivery and processing station or vehicle may convert the electronic contents into a physically deliverable item such as a printed letter, an advertisement printout, a photo album, a plastic card with magnetic storage strip or equivalent, a musical or video CD/DVD or its equivalent, or any deliverable object that embodies the magnetic media, optical media, and other types of medium as may be developed in the future.

The tangible deliverable will have a chip, we call it an Internet of Things device (ITD), attached to it. With the ITD, the tracking of the delivery and post-delivery activities can be continuous. Further, the communication between the ITD and the processing unit/center is an ongoing process, ensuring continual modification of the tracking parameters, etc.

The physically deliverable items are then delivered to the recipients followed by a delivery status report sent back to the user (Step 210). In this case, the designated recipient receives the network or electro-magnetically transmissible content embodied in a physical deliverable item. The delivery of the physically deliverable item can be flexibly arranged according to the instructions provided by the user when sending the contents through the network upload (Step 110) or by physical delivery of the contents to a local service station (Step 120).

Additionally, the processing and delivery station or vehicle may transfer the electronic contents through telecommunication network to an electronic content receiving/managing apparatus (ECRMA) (Step 220) that may include a passive receiver device or an e-mail device or any other network message receiving/managing apparatuses or devices.

Additionally, the processing and delivery station or vehicle may convert a part or whole of the electronic contents, as specified by the sender in Step 110 or Step 120 into a machine-readable code (MRC) and send the MRC through telecommunication network to the designated recipient (Step 230).

e-TC in the delivered tangible deliverable can then be sent and processed by sending the e-TC in the delivered tangible deliverable to an ECRMA (from Step 210 to Step 220). The e-TC embodied in the MRC can also be sent and processed to an ECRMA (from Step 230 to Step 220). There is a bi-directional e-TC and related information flow among any two of the processes of Steps 210, 220 and 230. The post-delivery activities of the e-TC can also be sent to the original sender via the route of 150, 140 and then to either 110 or 120.

The sender in Step 110 or Step 120 can request the three delivery modalities (Steps 210, 220 and 230) for delivery of the e-TC to be carried out at the same time, or in the combination of the available delivery routes, and in different sequence of the arrival time of the delivery.

In reality, the apparatus to carry out the functions of different steps in FIG. 1 can be either segregated in different locations or combined into a single physical setup. In the route from Step 110, the apparatus for Step 110, 140 and 150 can be either segregated in different locations or combined into one or several physical setups. In the route from Step 120, the apparatus for Steps 120, 130, 140 and 150 can be either segregated in different locations or combined into one or several physical setups.

Figure 2:
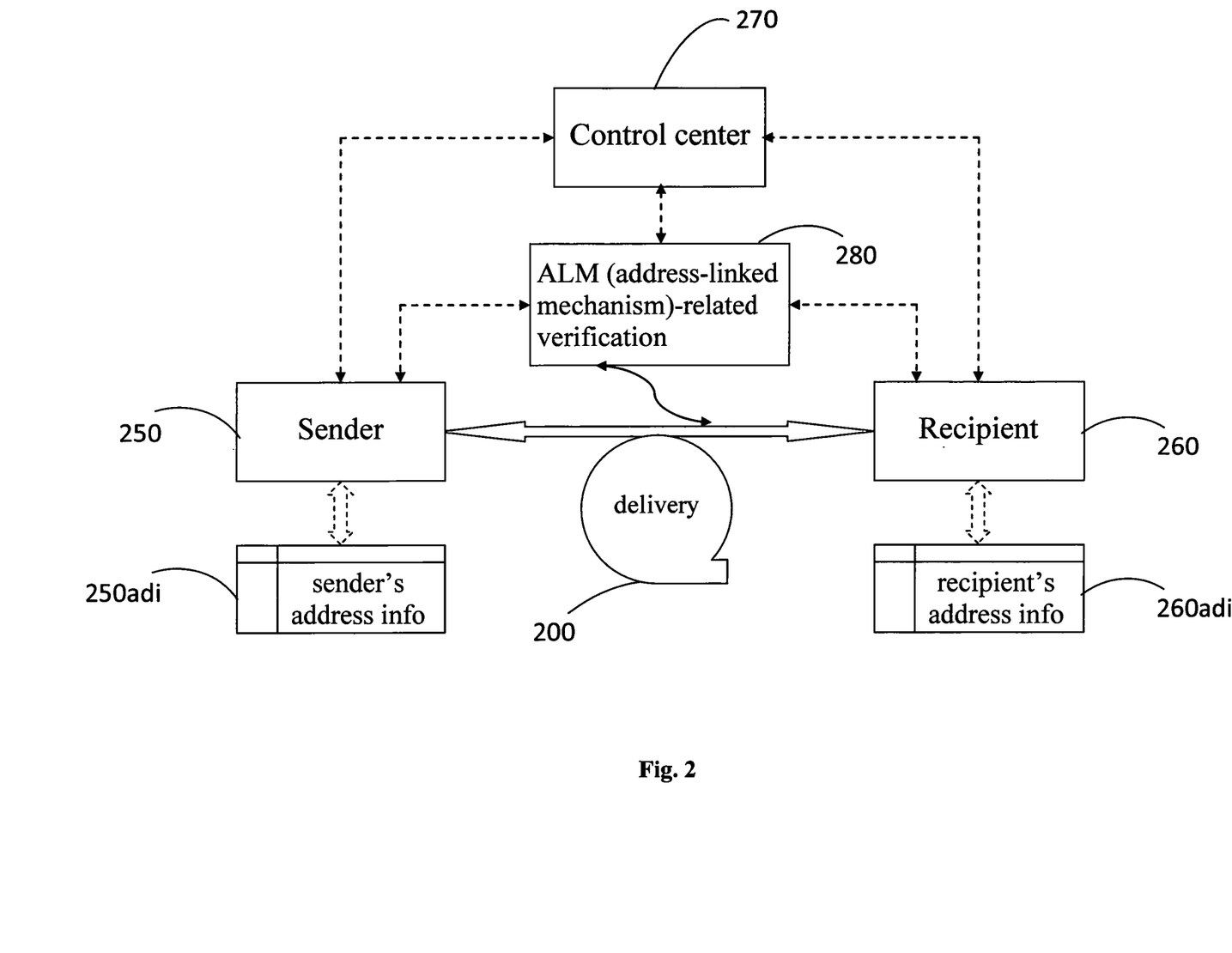
FIG. 2 is the flowchart for illustrating the workflow of the address-linked mechanism (ALM) when the delivery of a tangible deliverable, or a piece of e-TC, or an MRC, is performed between the sender and the recipient.

As in FIG. 2, it is shown that the addresses-linked mechanism (ALM) is one of the novel features of this invention. Both the sender (250) and the recipient (260) have their specific address information (250adi for the sender and 260adi for the recipient) linked to them. The contents of 250adi and 260adi are continuously updated for related changes as defined by the protocol set up by the sender (250), the recipient (260) and the control center (270).

When the sender (250) requests a delivery (200) of either a tangible deliverable (210 in FIG. 1), or a piece of e-TC to be delivered to an ECRMA (220 in FIG. 1), or an MRC (230 in FIG. 1), the sender requests to verify the delivery to arrive to the designated recipient (260). The ALM (280) is used in this invention to achieve this purpose.

Similarly, the recipient (260) can also request to verify the address info of the sender (250) in order to make sure that the incoming delivery or a purchase order that will result in a delivery (200) is coming from the intended sender.

Figure 3:
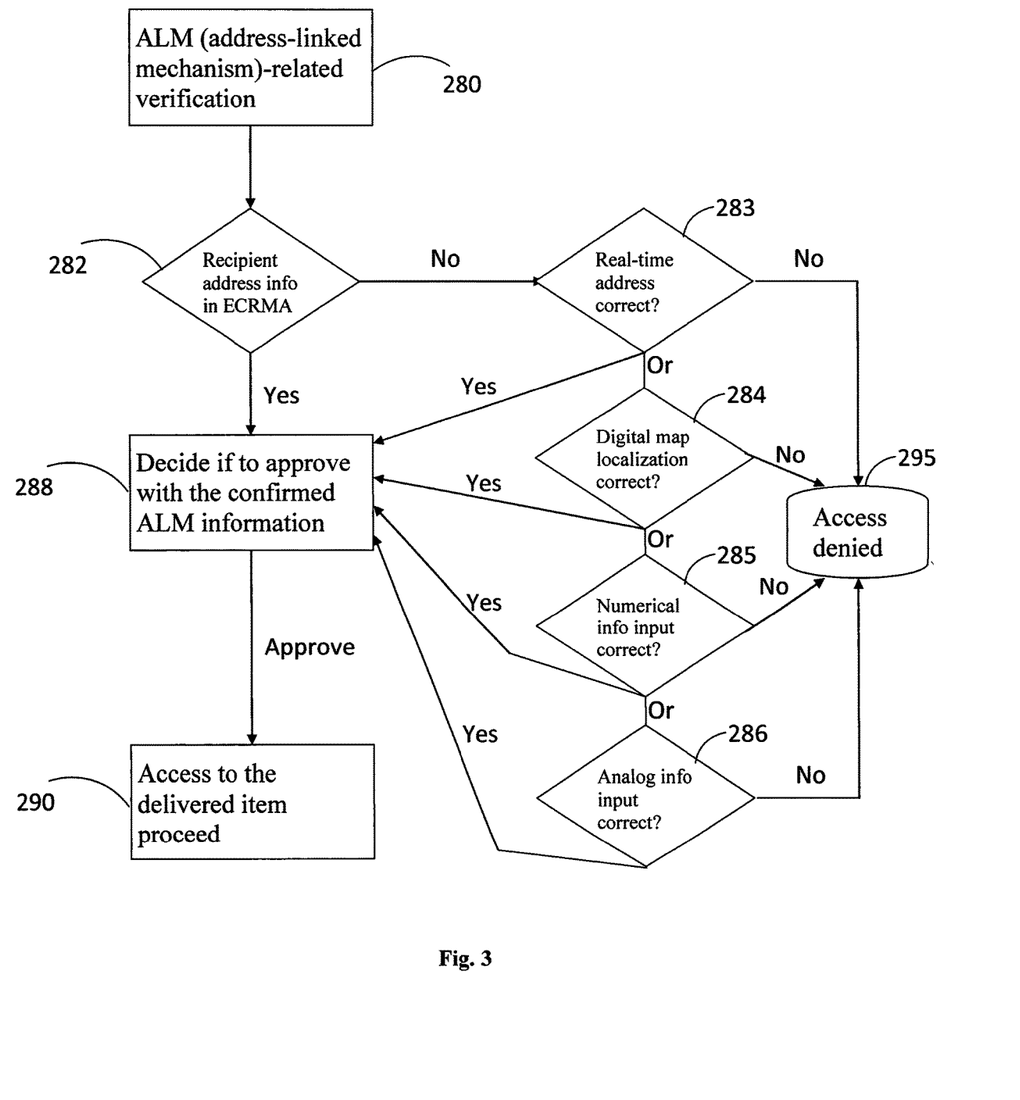
FIG. 3 is the flowchart for showing how the address-linked mechanism (ALM) works.

As shown in FIG. 3, the recipient can use an ECRMA registered with the physical address of the intended recipient (Step 282). In this case, the sender receives the confirmation that it is the recipient at this specific physical address. For example, a cellphone is a kind of ECRMA. The owner of this cellphone may have registered the physical address when this cellphone was activated for use.

If the answer of verification for Step 282 is "Yes", then the information is sent to Step 288 for decision-making by the system. If the answer of Step 282 is "No", for example, the ECRMA used for accessing the delivered item (Step 200 in FIG. 2) does not provide the required address information (Step 260adi in FIG. 2), then four different ways to perform the verification can be carried out, as in Step 283, or Step 284, or Step 285, or Step 286. The protocol set up by the sender (250 in FIG. 2) and accepted by the recipient (260 in FIG. 2) and regulated by the control center (270 in FIG. 2) will make the determination in a given situation as to how many verification steps will be used and how the sequence of the verification steps will proceed.

For Step 283, a real-time verification of the physical address is performed. When the delivery arrives at the destination, the access to the deliverable activates one or more of the localization processes as defined by the sender (250 in FIG. 2) and intercepted by the control center (270 in FIG. 2), for example, the localization of the ECRMA used by the recipient (260 in FIG. 2) is sent to the sender (250) and/or the control center (270). If the real-time localization of physical point confirms the presumed physical address (260adi), then the access to the deliverable may be approved by Step 288. An application of this feature is that a cellphone is used to scan an MRC (230 in FIG. 1) at the expected physical address, a localization process is then activated by the cellphone's localization application using either the global positioning system (GPS) or another localization application from the sender (250), or from the control center (270) or from a third party. The address identified by the localization process confirms that the address is the same as the designated delivery location, and then the subsequent process of accessing this MRC may be approved (Step 288) and then can proceed (Step 290).

It is possible that the recipient is accessing the delivered content (200 in FIG. 2) at a location other than the designated location. In this case, Step 283 will not provide the needed information for verification. Then the other three steps (Step 284, 285 and 286) can be performed to provide information for the verification.

In Step 284, a digital map is activated from ECRMA used for accessing the delivered content (200 in FIG. 2). This ECRMA may not have the needed address recipient information (260adi in FIG. 2) and is accessing the delivered content away from the designated physical address of the recipient. The activated map application is from the sender (250), or from the control center (270), or from a third party. The person using this ECRMA is asked to guide the map to point to the sender-intended physical address. If the localization on the map confirms that the address is the same as the designated delivery location, then the subsequent process of accessing this MRC may be approved (Step 288) and then can proceed (Step 290).

In Step 285, the person accessing the delivery (200 in FIG. 2) is asked to enter the numerical (and/or alphanumeric) information that is related to the designated recipient's physical address. The alphanumerical information can be one point of, or the combination of, the information related to the designated recipient's physical address, such as the street number of the address, the ZIP code, the size of the square footage of this physical address in government registration, etc. The numerical information format that is requested can be from the sender (250 in FIG. 2), or from the control center (270 in FIG. 2), or from a third party. For example, the question requesting for the numerical information may ask, "Please enter the digit(s) of the street number, followed by the last three digits of the ZIP code of this address". If the numerical information provided conforms with the information in the Step 260*adi* in FIG. 2, the protocol regards the person accessing the delivery (200) as the intended recipient at the designated delivery location, then the subsequent process of accessing this delivery may be approved (Step 288) and then can proceed (Step 290).

In Step 286, the person accessing the delivery (200 in FIG. 2) is asked to enter a kind of analog information that is related to the designated recipient's physical address. The analog information can be an audio signal such as the voice of this person in speaking out the physical address of the intended delivery, or a graphical signal such as the drawing of the letters of the street name, etc. The analog information format requested can be from the sender (250 in FIG. 2), or from the control center (270 in FIG. 2), or from a third party. If the analog information provided conforms with the information in the Step 260*adi* in FIG. 2, the protocol regards the person accessing the delivery (200) as the intended recipient at the designated delivery location, then the subsequent process of accessing this delivery may be approved (Step 288) and then can proceed (Step 290).

For Steps 283, 284, 285 and 286, if the verification process yields a "No" (incorrect) response, then the process is led to Step 295, resulting in the denial of access to the delivery (200 in FIG. 2).

Figure 4:
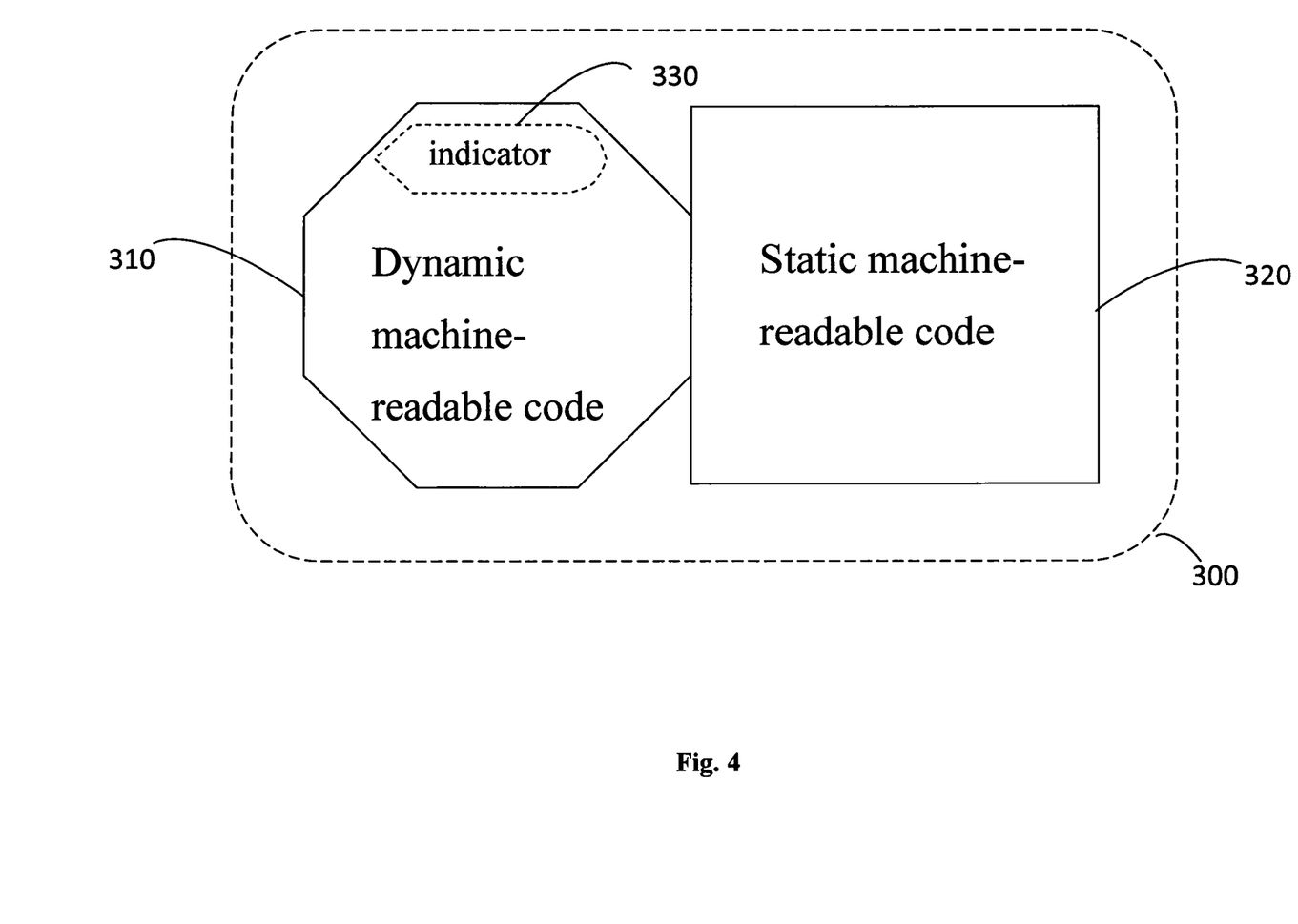
FIG. 4 shows the structure of a machine-readable code compound (MRCC) and its components.

FIG. 4 shows a machine-readable code compound (MRCC, 300) that is the basic unit of the machine-readable code (MRC) system in this invention. An MRCC is composed of at least a dynamic MRC (310) and a static MRC (320). The two components interact closely.

The dynamic MRC component has an indicator region (330) to show the dynamic information of this MRCC, such as the date and time of most recent information update, etc. The indicator region can show its changed status with one or the combination of different digits, colors, contours, audio information or any other digitally-manageable formats.

The address-link-mechanism (ALM), as described in FIG. 2 and FIG. 3, is an integral part of the MRCC. The indicator region will constantly display the status of the ALM specific to this MRCC, such as whether the ALM is in good or approved status, last update of the ALM information, etc.

Figure 5:
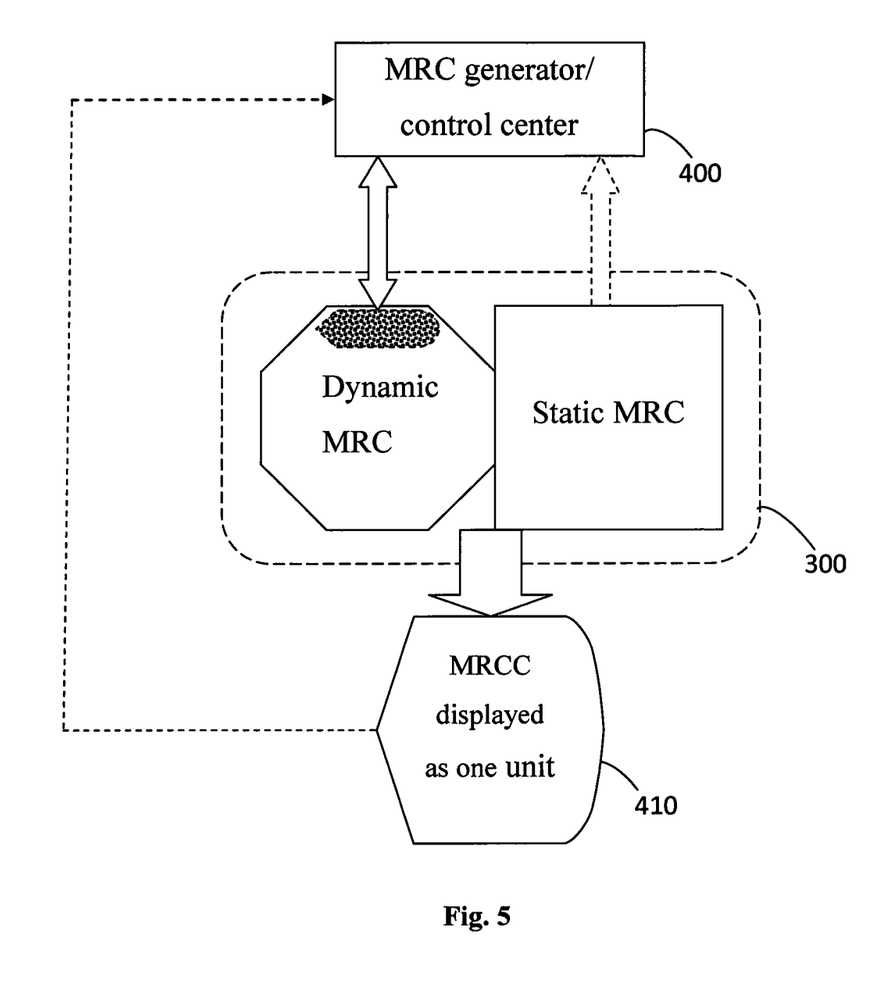
FIG. 5 shows the interaction of the machine-readable code compound (MRCC) with its control unit, the MRC generator (400), and with its other display form (410).

FIG. 5 shows that the three major components in the workflow of an MRC compound (MRCC). They are the MRC generator (Step 400), the machine-readable code compound (MRCC, Step 300 which is the same as in FIG. 4) and a graphic user interface display code (Step 410).

Step 400 creates a new MRCC object, instantiates a new static MRC and dynamic MRC with values passed in.

Step 300 does data validation and passes in values into Step 400.

Step 410 consists of a graphic user interface display code and some action calling functions.

The dynamic MRC is constantly in interaction with its control unit. The information of an access to the dynamic MRC including the address-link-mechanism (ALM) will be relayed to the MRC generator. Then 400 will make the response according to the set protocol.

Alternatively, an access to the static MRC will also be relayed to 400. Then 400 will make the response according to the set protocol.

A user can access either the dynamic MRC or the static MRC.

The difference in the interaction from the dynamic MRC or the static MRC with the control center/MRC generator 400 is that the information flow is constant between the dynamic MRC and the MRC generator (400) while the information flow is activated only when a static MRC is accessed.

When a machine-readable code compound (MRCC) is printed out or displayed, the printed-out or displayed form (410) can take the structure of either the original MRCC, i.e., a form with at least one dynamic MRC and one static MRC, or the MRCC can be converted through a special software program, into one special MRC code. When this MRCC-converted MRC is accessed—e.g., scanned with an ECRMA (electronic content receiving and/or managing apparatus), it will lead to the original MRCC. In the mean time, access to this MRCC-converted MRC will also lead to the information relay to the control center/MRC generator.

Examples of the software rendering of the above description are in the files of 'FIG. 5—Example software representation' and 'FIG. 5—Example C++ program'.

Figure 6:
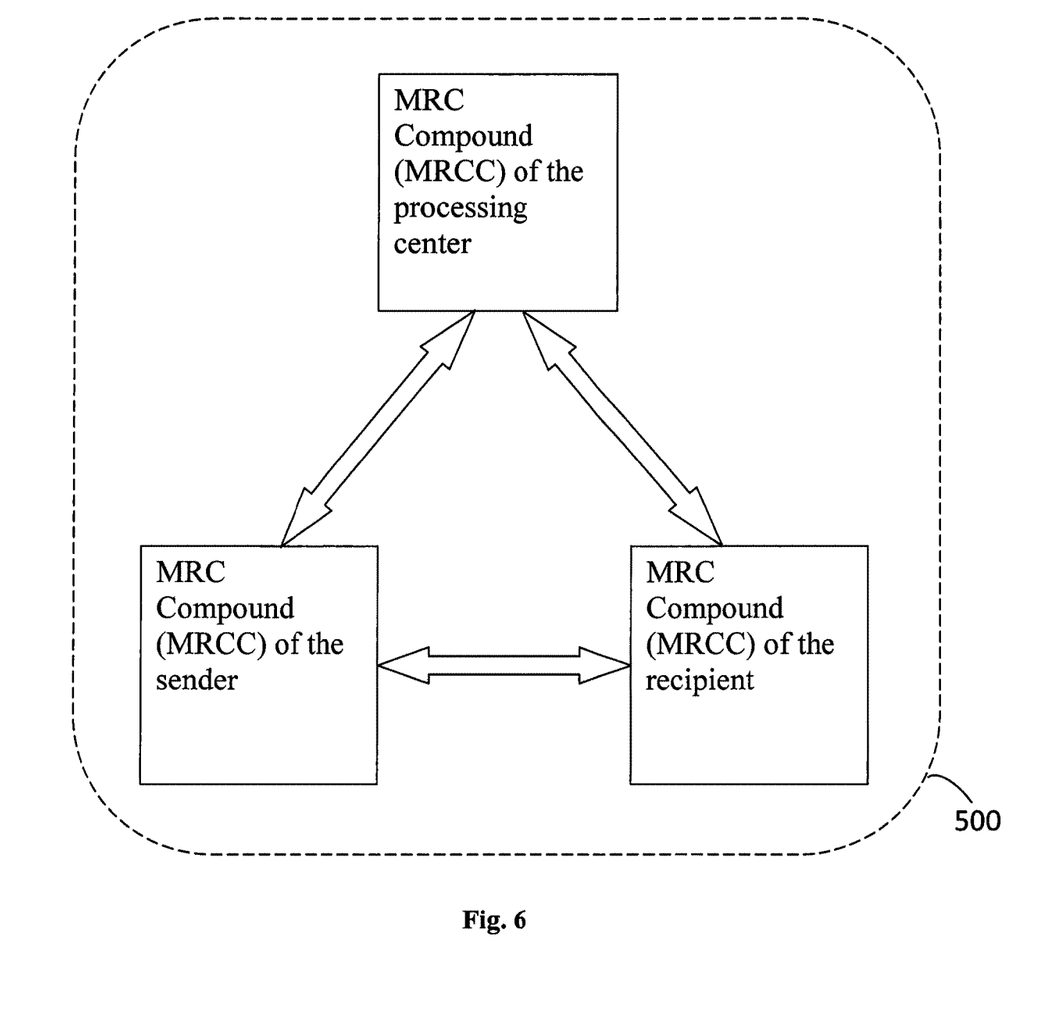
FIG. 6 shows the structure of a machine-readable code compound group (MRCCG) and its components.

FIG. 6 shows the MRC compound group (MRCCG, 500) and how an individual MRCC functions among this group.

Each of the MRCCs in the MRCCG can undergo its own changes directed by its own control system/MRC generator.

A change in a given MRCC in the MRCCG can be transmitted to one or more other MRCCs as arranged by the control protocol of the MRCCG, i.e., the information update in the MRCCG is both ways or three or more ways changeable.

Before joining this MRCCG, if an MRC is not in the format of the MRCC with at least one dynamic MRC and one static MRC, a special protocol will transform this MRC into the acceptable MRCC.

The MRCCG can be as a whole entity transmitted and/or displayed.

An example of application of the MRCCG can be found in the field of digital advertising. A request to send an electronic ad in the form of e-TC is sent from the sender (250 in FIG. 2). The information of this ad is transformed into an MRCC by the sender. Before this ad's arrival to the intended recipient, the sender wants to update the ad with new information added. Thus by the time this ad arrives at the recipient, the recipient receives the most recent version of this ad as appears in the MRCC of the sender. Upon accessing this most recent version of the ad, the recipient makes some changes as the response to the advertized content, generating an MRCC of the recipient. This MRCC of the recipient can then be accessed by the sender and/or the processing center, or to be sent to a third party, such as a friend of the initial designated recipient, as a recommend purchase choice. If the MRCC of the recipient is sent to a third party, another process of sender to recipient will be created and the original recipient will become the sender in this new process.

Figure 7:
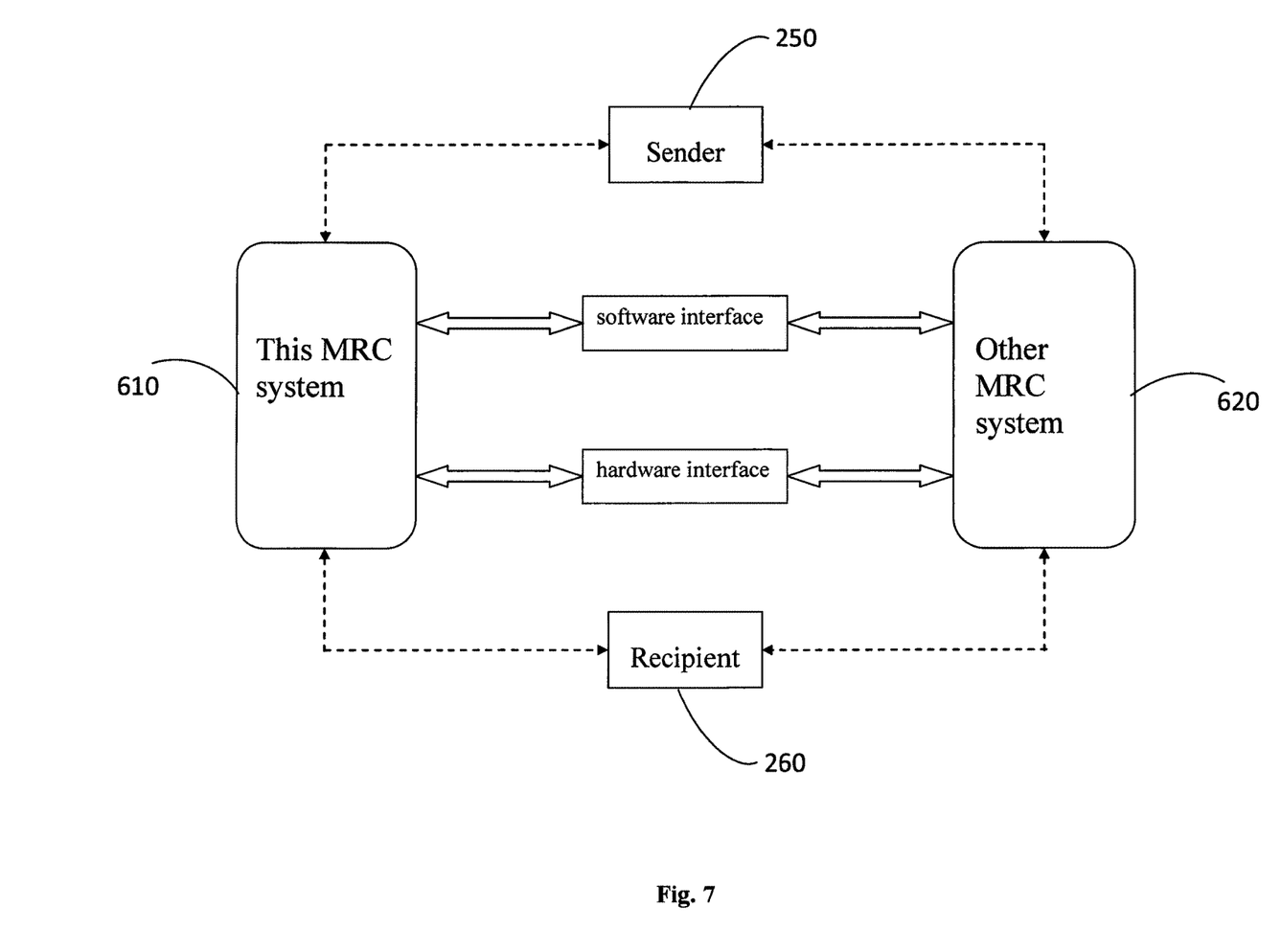
FIG. 7 describes how the MRC system in this invention can perform information/data exchange with other MRC systems.

FIG. 7 describes how the MRC system in this invention can perform information/data exchange with other MRC systems.

A predefined protocol from the MRC system in this invention is communicated with another MRC system that needs to accept the protocol from this invention. Then the information/data exchange can proceed.

The connection between the two MRC systems can be accomplished with either software interface or hardware interface.

Input from the e-TC sender and recipient are required before the exchange can proceed.

One of the prerequisites for the exchange is to verify the ALM of the e-TC sender and recipient. This prerequisite can ensure the security for the information/data to be exchanged.

If the other MRC system is not in the format of the MRC system, i.e., in the format of an MRCC with at least one dynamic MRC and one static MRC, a special protocol will transform the other MRC system into the acceptable MRC system compatible with the MRC system in this invention.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A network communication system comprising:
   a network processing station for receiving and converting electro-magnetic data transmitted through telecommunication network into a hybrid content deliverable object that comprises network transmissible content data files and a physically deliverable object for carrying out a hybrid delivery of the data files and the physically deliverable object by a physical delivery process and a network electro-magnetic delivery process from a sender to a recipient and an electronic content receiving/managing apparatus (ECRMA); and
   the physically deliverable object includes a chip as an Internet of Things device (ITD) embodies the data files and the physically deliverable object further includes a digitally readable machine-readable code (MRC) wherein the MRC further includes an address linked mechanism (ALM) for carrying out ALM related verification of a physical address of the sender and a physical address of the recipient that includes a physical address specific code in the MRC to allow the recipient to apply the machine readable code (MRC) to access the network transmissible content data files.

2. The network communication system of claim 1 wherein:
   the ITD embodies the data files on the physically deliverable object further comprises an address linked mechanism (ALM) device to verify the physical address of the sender and the physical address of the recipient for linking the sender and recipient under the control of the network communication system.

3. The network communication system of claim 2 wherein:
   the address linked mechanism (ALM) device further verifies a cellphone number of the recipient to allow the recipient to apply the machine readable code (MRC) to access the network transmissible content data files.

4. The network communication system of claim 1 wherein:
   the network transmissible content data files sent from the sender to the recipient as that verified by the ALM and linked under the control of the network communication system are continuously updated.

5. The network communication system of claim 1 wherein:
   the network transmissible content data files send from the sender are further sent to an electronic content receiving and managing apparatus (ERCMA) to transmit the network transmissible content data files to the recipient.

6. The network communication system of claim 1 wherein:
   the network transmissible content data files send from the sender further comprise advertisement specifically targeted to the recipient at the physical address included in the address linked mechanism (ALM).

7. The network communication system of claim 1 wherein:
   the digitally readable code (MRC) embodied on the physically deliverable object further comprises a static component and a dynamic component for tracking post-delivery events of the physically deliverable object.

8. The network communication system of claim 1 wherein:
   the network transmissible content data files send from the sender are further sent to an electronic content receiving and managing apparatus (ERCMA) to transmit the network transmissible content data files to the recipient wherein the network transmissible content data files further comprises the machine readable code (MRC).

9. The network communication system of claim 8 wherein:
   the MRC received from the ERCMA by the recipient further includes an address linked mechanism (ALM) for carrying out ALM related verification of a physical address of the sender and a physical address of the recipient for linking the sender and recipient under the control of the network communication system.

10. The network communication system of claim 8 wherein:
    the ERCMA further verifies the physical address of the recipient by receiving a physical address verification confirmation from the recipient.

11. The network communication system of claim 1 further comprising:
    the address-link-mechanism (ALM) further includes a voice recognition verification by verifying a recipient's voice to allow the recipient to apply the machine readable code (MRC) to access the network transmissible content data files.

* * * * *